United States Patent [19]

Hall et al.

[11] 4,166,605

[45] Sep. 4, 1979

[54] DEVICE FOR METERING LIQUIDS

[75] Inventors: Samuel S. Hall, Hornchurch; Francis J. Caves, Brentwood, both of England

[73] Assignee: Plessey Handel und Investments AG, Zug, Switzerland

[21] Appl. No.: 760,664

[22] Filed: Jan. 19, 1977

[30] Foreign Application Priority Data

Jan. 20, 1976 [GB] United Kingdom ............... 2203/76
Feb. 21, 1976 [GB] United Kingdom ............... 6949/76

[51] Int. Cl.² ............................................. F16K 31/02
[52] U.S. Cl. ..................................... 251/129; 137/38; 137/522; 137/DIG. 2
[58] Field of Search ................... 137/38, 522, DIG. 2; 222/500; 251/129

[56] References Cited

U.S. PATENT DOCUMENTS

| 646,349 | 3/1900 | Brawner | 222/500 |
|---|---|---|---|
| 2,425,313 | 8/1947 | Hammerstein | 222/500 |
| 2,887,294 | 5/1959 | Hahn | 251/129 |
| 3,819,116 | 6/1974 | Goodinge | 239/102 |
| 3,884,417 | 5/1975 | Sheffield | 239/102 |
| 3,949,938 | 4/1976 | Goodinge | 239/102 |
| 3,981,480 | 9/1976 | Eernisse et al. | 251/129 |

Primary Examiner—Robert G. Nilson
Attorney, Agent, or Firm—Fleit & Jacobson

[57] ABSTRACT

A device for metering liquids, which device comprises a body, a liquid conduit in the body, vibration means for vibrating the body, a valve for opening the conduit when the body is being vibrated and for closing the conduit when the body is not being vibrated, and a conduit external of the body and arranged to conduct liquid towards or away from the conduit in the body, the device being such that in operation liquid fed along one of the conduits is metered along the other conduit by activating the vibration means for a desired liquid metering time to cause the valve to open the conduit in the body.

7 Claims, 8 Drawing Figures

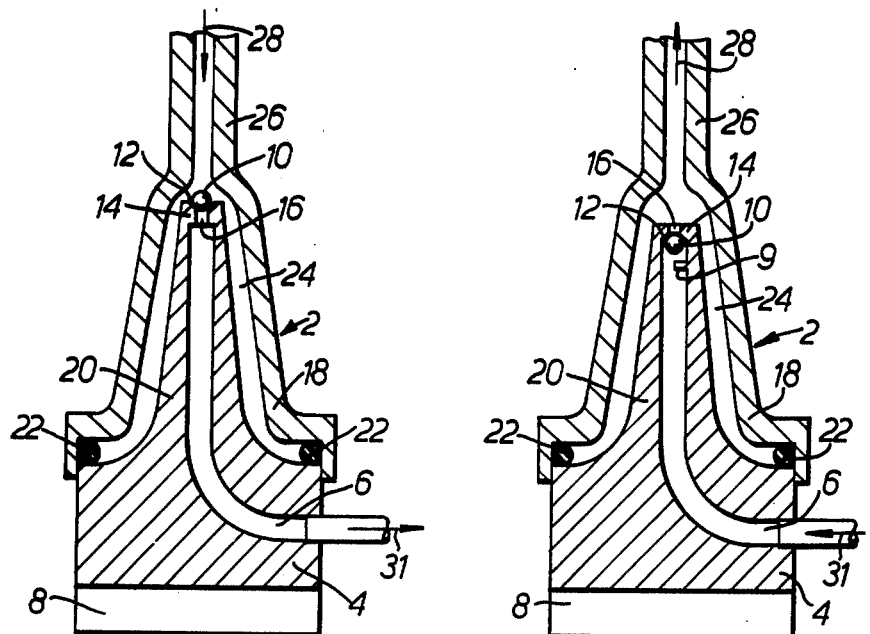
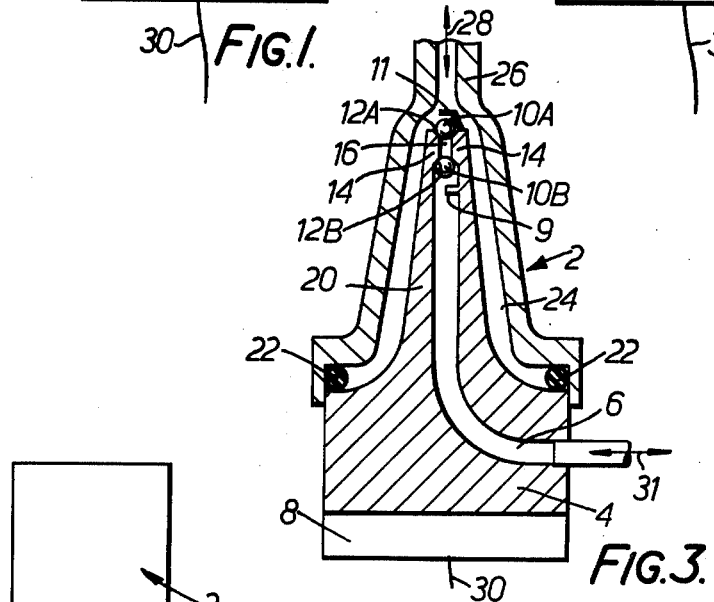
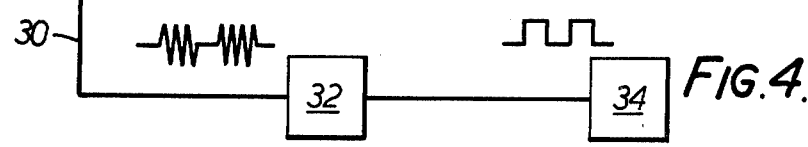

DEVICE FOR METERING LIQUIDS

This invention relates to a device for metering liquids. Examples of liquids that may be metered are fuels for engines, hydraulic liquids for vehicle brakes and clutches, lubricants for machinery, and chemicals to be dispensed in predetermined amounts.

Accordingly, this invention provides a device for metering liquids, which device comprises a body, a liquid conduit in the body, vibration means for vibrating the body, a valve for opening the conduit when the body is being vibrated and for closing the conduit when the body is not being vibrated, and a conduit external of the body and arranged to conduct liquid towards or away from the conduit in the body, the device being such that in operation liquid fed along one of the conduits is metered along the other conduit by activating the vibration means for a desired liquid metering time to cause the valve to open the conduit in the body.

If desired, the device of the invention may be such that the conduit external of the body is provided in a housing arranged around at least a part of the body. In this case, a chamber for the liquid is preferably formed between the body and the housing. Alternatively, the device of the invention may be such that the conduit external of the body is arranged at one end of the body, the conduit being in a housing which vibrates with the body when the body is being vibrated. In this case, the housing is preferably joined to the end of the body at a position which is a vibration anti-node when the body is being vibrated by the vibration means.

In a first embodiment of the invention, the valve is seated outside the conduit in the body such that, when the valve is closing the conduit, the valve presents the liquid flowing from the conduit external of the body to the conduit in the body.

In a second embodiment of the invention, the valve is seated in the conduit in the body such that, when the valve is closing the conduit, the valve prevents liquid flowing from the conduit in the body to the conduit external of the body.

In a third embodiment of the invention, the valve has a first portion seated outside of the conduit in the body and a second portion seated in the conduit in the body, the first portion being such that when it is closing the conduit in the body it prevents liquid flowing from the conduit external of the body to the conduit, in the body, and the second portion being such that when it is closing the conduit in the body it prevents liquid flowing from the conduit in the body to the conduit external of the body.

Usually, the valve will be positioned substantially at that part of the body which is at an anti-node when the body is being vibrated. At the anti-node, the vibrations of the body will be at their largest so that the valve can best be opened at this point. Preferably, the valve is a ball valve but other types of valve can be employed if desired.

Preferably, the vibration means is a piezoelectric device. Other vibration means can however be employed such for example as a magnetostrictive device or a solenoid operated device. It is presently preferred that the vibration means vibrate the body with ultrasonic vibrations to provide minimal noise.

The metering device of the invention may be associated with appropriate electrical circuitry for determining precisely when and for how long the body is to be vibrated to allow it to meter the liquid. Obviously, the time and the period of the vibration will depend upon the liquid being metered and the intended purpose of the liquid. Thus, for example, if the liquid being metered is fuel for a diesel engine, then the time and period of the vibrations will be related to the engine cycle. If the liquid being metered is a lubricating oil for one or more parts of a piece of machinery, then the time and period of the vibrations will depend upon the lubrication requirements of the machinery.

Embodiments of the invention will now be described solely by way of example and with reference to the accompanying drawings in which:

FIG. 1 is a longitudinal cross section through a first metering device in accordance with the invention;

FIG. 2 is a longitudinal cross section through a second metering device in accordance with the invention;

FIG. 3 is a longitudinal cross section through a third metering device in accordance with the invention;

FIG. 4 shows a metering system having a metering device of the type shown in any one of FIGS. 1 to 3;

Figure 5:
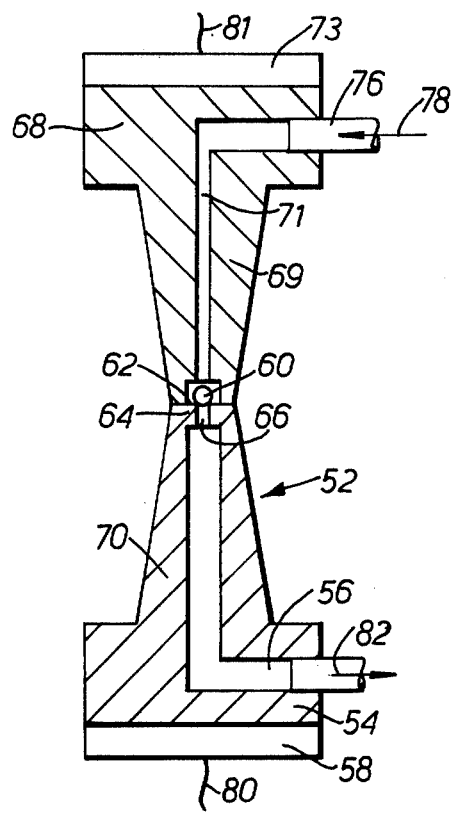
FIG. 5 is a longitudinal cross section through a fourth metering device in accordance with the invention.

Referring to FIG. 1, there is shown a device 2 for metering liquids, e.g. fuels or lubricating oils. The device 2, which may be a half wave length resonant horn device, comprises a body 4, a liquid conduit 6 in the body 4 and vibration means in the form of a piezoelectric ceramic device 8 attached to the body 4 as shown. The device 2 also comprises a ball valve 10 which seats on a valve seat 12 which is outside of the conduit 6. The valve seat 12 is formed as shown in an inwardly projecting annular shoulder 14 having a passage 16 therein. The device 2 further comprises a housing 18 arranged around the horn part 20 of the device 2. The housing 18 is secured to the body 4 by any convenient means at annular ring 22. Preferably, the housing 18 is secured to the body 4 at a vibration node. The ring 22 forms a seal so that there is formed a liquid chamber 24 between the horn portion 20 of the body 4 and the housing 18. The housing 18 terminates in a pipe portion 26.

The metering device 2 shown in FIG. 1 operates as follows. Liquid is passed down the pipe portion 26 in the direction of the arrow 28. The liquid enters the chamber 24. When the body 4 is not being vibrated, the ball valve 10 is on its seat 12 and the liquid in the chamber 24 cannot escape.

When the piezoelectric device 8 is excited by passing an electric current through the lead 30, the device 8 causes the body 4 to vibrate. Now the valve 10 is arranged to be positioned at a node formed when the body 4 is vibrating so that as the body 4 vibrates, the valve 10 is lifted off its seat 12. Liquid in the chamber 24 can thus pass into the conduit 6 and can then be directed in the direction of arrow 31 to its intended destination. By stopping the supply of electric current, the body 4 ceases to vibrate and the valve 10 is caused to return to its seat 12 under the action of the fluid in the chamber 24 and/or gravity and/or a spring (not shown).

It will thus be apparent that the time and amount of the liquid metered by the device 2 can be easily controlled by applying appropriate electrical signals to the device 2 to cause it to vibrate. The flow of liquid can thus be controlled, for example, by varying all or any of the following variables: the pulse width, the pulse repetition frequency, the liquid pressure drop across the valve, and the amplitude of vibration of the body 4.

The sealing ring 22 is arranged to be at a node when the body 4 is vibrated so that little or no vibration is transferred to the housing 18. This avoids loss of energy from the body 4 to the housing 18 and also enables the pipe portion 26 to be joined to a liquid supply line without the presence of excessive vibrations.

Referring now to FIGS. 2 and 3, there are shown two more metering devices 2 which are similar to the metering device 2 of FIG. 1. Similar parts have been given the same reference numerals and their detailed description and mode of operation will not be given again.

Referring specifically to FIG. 2, it will be seen that the ball valve 10 is positioned in the conduit 6. The valve 10 seats against its valve seat 12 which is also in the conduit 6 as shown. Also provided in the conduit 6 is a valve stop device 9 in the form of an inwardly projecting shoulder. This stop device 9 is effective to limit the amount of travel of the valve 10 off its seat 12. Because the valve 10 is positioned as shown, it will be apparent that the flow of liquid is firstly into the conduit 6 in the direction of arrow 31 and then into the chamber 24 when the body is vibrated and the valve 10 is lifted off its seat 12. Liquid in the chamber 24 can then pass along the pipe portion 26 in the direction of the arrow 28 to its desired destination.

Referring now specifically to FIG. 3, it will be seen that the device 2 has a two way valve. One valve part is numbered 10A and seats against a valve seat 12A and operates as in the above described embodiment for FIG. 1. The other valve part is numbered 10B and seats against a valve seat 12B and operates as in the above described embodiment for FIG. 2. The device 2 will thus be effective to allow liquid to pass from chamber 24 to conduit 6 or from conduit 6 to chamber 24 as desired. A valve stop device 11 is effective to prevent the valve part 10A becoming lost during passage of liquid from conduit 6 to chamber 24.

Referring now to FIG. 4, there is shown in block diagram only a metering device 2 in accordance with the invention. This metering device 2 may be any one of the metering devices shown in FIGS. 1 to 3. The device 2 is caused to vibrate by electrical signals passing along lead 30 to the piezoelectric device 8 which forms part of the device 2. The signals come from an oscillator 32. The oscillator is energised by a frequency and pulse width controller 34. Usually, the signals will be such that the ball valve will always be lifted off its seat by the same amount for varying periods of time depending upon how much liquid is to be metered. The metering device 2 will also usually have a substantially infinite turn down ratio capability.

Referring to FIG. 5, there is shown a device 52 for metering liquids, e.g. fuels or lubricating oils. The device 52, which may be a half wave length resonant horn device, comprises a body 54, a liquid conduit 56 in the body 54 and vibration means in the form of a piezoelectric ceramic device 58 attached to the body 54 as shown. The device 52 also comprises a ball valve 60 which seats on a valve seat 62 which is outside of the conduit 56. The valve seat 62 is formed as shown in an inwardly projecting annular shoulder 64 having a passage 66 therein.

The device 52 further comprises a housing 68 formed integrally with, or secured as by welding, to the tip of the horn part 70 of the device 52. The housing 68 has the same shape as the body 54 and it thus has a horn part 69. The horn part 69 is provided with a conduit 71 as shown. The conduit 71 is external of the body 54. Attached to the housing 68 is vibration means in the form of a piezoelectric ceramic device 73 which enables the housing 68 to vibrate in synchronisation with the body 54. The housing 68 terminates in a pipe portion 76.

The metering device 52 shown in FIG. 5 operates as follows. Liquid is passed down the pipe portion 76 in the direction of the arrow 78. The liquid enters the conduit 71. When the body 54 is not being vibrated, the ball valve 60 is on its seat 62 and the liquid in the conduit 71 cannot escape.

When the piezoelectric devices 58 and 73 are excited by passing an electric current through the leads 80, and 81, the device 58 causes the body 54 to vibrate and the device 73 causes the housing 68 to vibrate. Now the valve 60 is arranged to be positioned at an anti-node formed when the body 54 is vibrating so that as the body 54 vibrates, the valve 60 is lifted off its seat 62. Liquid in the conduit 71 can thus pass into the conduit 56 and can then be directed in the direction of arrow 82 to its intended destination. By stopping the supply of electric current, the body 54 ceases to vibrate and the valve 60 is caused to return to its seat 62 under the action of the fluid in the conduit 71 and/or gravity and/or a spring (not shown). The housing 68 is caused to vibrate in synchronisation with the body 54 so that the housing 68 does not act to damp the vibrations of the body 54. This can be advantageous in getting good lift off of the valve 60.

It will thus be apparent that the time and amount of the liquid metered by the device 52 can be easily controlled by applying appropriate electrical signals to the device 52 to cause it to vibrate. The flow of liquid can thus be controlled, for example, by varying all or any of the following variables: the pulse width, the pulse repetition frequency, the liquid pressure drop across the valve, and the amplitude of vibration of the body 54 and the housing 68.

Figure 6:
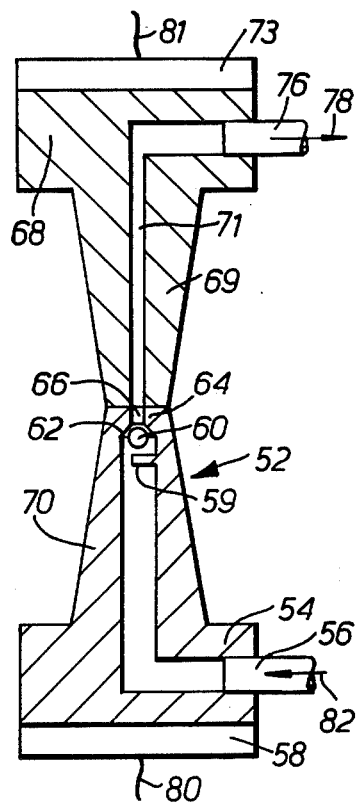
FIG. 6 is a longitudinal cross section through a fifth metering device in accordance with the invention.
Figure 7:
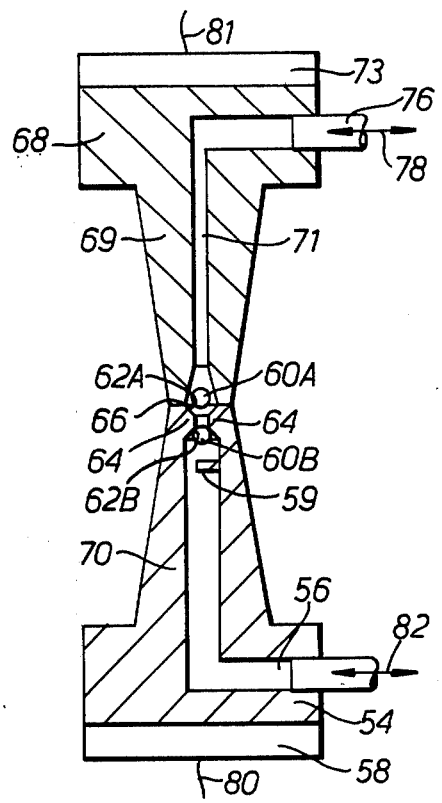
FIG. 7 is a longitudinal cross section through a sixth metering device in accordance with the invention.

Referring now to FIGS. 6 and 7, there are shown two more metering devices 52 which are similar to the metering device 52 of FIG. 5. Similar parts have been given the same reference numerals and their detailed description and mode of operation will not be given again.

Referring specifically to FIG. 6, it will be seen that the ball valve 60 is positioned in the conduit 56. The valve 60 seats against its valve seat 62 which is also in the conduit 56 as shown. Also provided in the conduit 56 is a valve stop device 59 in the form of an inwardly projecting shoulder. This stop device 59 is effective to limit the amount of travel of the valve 60 off its seat 62. Because the valve 60 is positioned as shown, it will be apparent that the flow of liquid is firstly into the conduit 56 in the direction of arrow 82 and then into the conduit 71 when the body is vibrated and the valve 60 is lifted off its seat 62. Liquid in the conduit 71 can then pass along the pipe portion 76 in the direction of the arrow 78 to its desired destination.

Referring now specifically to FIG. 7, it will be seen that the device 52 has a two way valve. One valve part is numbered 60A and seats against a valve seat 62A and operates as in the above described embodiment for FIG. 5. The other valve part is numbered 60B and seats against a valve seat 62B and operates as in the above described embodiment for FIG. 6. The device 52 will thus be effective to allow liquid to pass from conduit 71 to conduit 56 or from conduit 56 to conduit 71 as desired.

Figure 8:
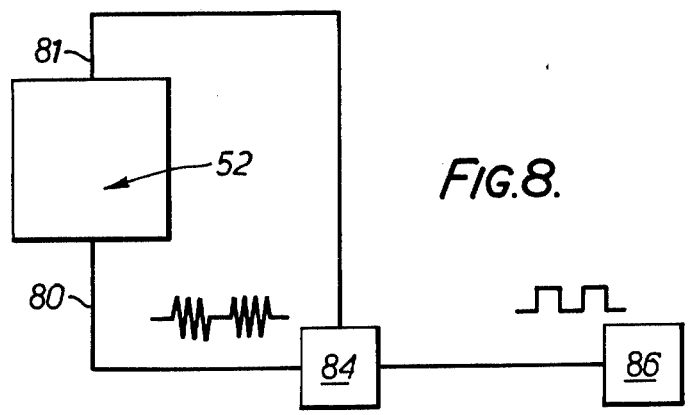
FIG. 8 shows a metering system having a metering device of the type shown in any one of FIGS. 1 to 3.

Referring now to FIG. 8, there is shown in block diagram only a metering device 52 in accordance with the invention. This metering device 52 may be any one of the metering devices shown in FIGS. 5 to 7. The device 52 is caused to vibrate by electrical signals passing along leads 80, 81 to the piezoelectric devices 58, 73 which form part of the device 52. The signals come from an oscillator 84. The oscillator is energised by a frequency and pulse width controller 86. Usually, the signals will be such that the ball valve will always be lifted off its seat by the same amount for varying periods of time depending upon how much liquid is to be metered. The metering device 52 will also usually have a substantially infinite turn down ratio capability.

It is to be appreciated that the embodiments of the invention described above have been given by way of example only and that modifications may be effected. Thus, for example, different liquids may at different times be metered. The oscillator and controller may be used to energize more than one metering device so that, for example, lubrication fluid could be controllably injected to many parts of a piece of machinery or a whole machinery complex. The vibration means 73 can be omitted so that vibration is effected solely by the vibration means 58. In this case, the housing 68 should preferably be of an appropriate mass so that it does not unduly act to damp the action of the vibration means 58. The body 4 or 54 can be provided with liquid swirling grooves and/or orifices near the ball valve 10 or 60 to improve the lift off of the valve from its valve seat.

What we claim is:

1. A device for metering liquids, which device comprises a body, a liquid conduit in the body, electrically activated vibration means connected to said body for vibrating the body, a valve for opening the liquid conduit when the body is being vibrated and for closing the liquid conduit when the body is not being vibrated, and a conduit external of the body and arranged to conduct liquid towards or away from the liquid conduit in the body, a housing containing the conduit external of the body, the housing being joined to a portion of the body at a position which is spaced from a vibration node when the body is being vibrated by the vibration means, so that the housing is free to vibrate with the body when the body is being vibrated, the device being such that in operation liquid fed along one of the conduits is metered along the other conduit by activating the vibration means for a desired liquid metering time to cause the valve to open the liquid conduit in the body.

2. A device according to claim 1 in which the valve is seated outside the conduit in the body such that, when the valve is closing the conduit, the valve prevents the liquid flowing from the conduit external of the body to the conduit in the body.

3. A device according to claim 1 in which the valve is a ball valve which is positioned substantially at that part of the body which is at an anti-node when the body is being vibrated; and in which the vibration means is a piezoelectric device.

4. A device for metering liquids, which device comprises a body, a liquid conduit in the body, electrically activated vibration means connected to said body for vibrating the body, a valve for opening the conduit when the body is being vibrated and for closing the conduit when the body is not being vibrated, and a conduit external of the body and having one end connected to said body for conducting liquid towards or away from the conduit in the body, the device being such that in operation liquid fed along one of the conduits is metered along the other conduit by activating the vibration means for a desired liquid metering time to cause the valve to open the conduit in the body.

5. A device for metering liquids, which device comprises a body, a liquid conduit in the body, electrically activated vibration means connected to said body for vibrating the body, a valve for opening the conduit when the body is being vibrated and for closing the conduit when the body is not being vibrated, and a conduit external of the body and arranged to conduct liquid towards or away from the conduit in the body, the valve having a first portion seated outside the conduit in the body such that, when the first portion of the valve is closing the conduit, the valve prevents liquid flowing from the conduit external of the body to the conduit in the body, the device being such that in operation liquid fed along one of the conduits is metered along the other conduit by activating the vibration means for a desired liquid metering time to cause the valve to open the conduit in the body.

6. A device according to claim 5 in which the conduit external of the body is provided in a housing arranged around at least a part of the body.

7. A device according to claim 5 in which the valve has a portion seated in the conduit in the body, the portion being such that when it is closing the conduit in the body it prevents liquid flowing from the conduit in the body to the conduit external of the body.

* * * * *